United States Patent
Qiu

(10) Patent No.: US 11,741,038 B1
(45) Date of Patent: Aug. 29, 2023

(54) METHOD, SERVER SYSTEM, AND NON-TRANSITORY COMPUTER READABLE MEDIUM FOR HOT PLUGGING

(71) Applicant: Fulian Precision Electronics (Tianjin) Co., LTD., Tianjin (CN)

(72) Inventor: Duo Qiu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/854,292

(22) Filed: Jun. 30, 2022

(30) Foreign Application Priority Data

Mar. 28, 2022 (CN) .......................... 202210314469.7

(51) Int. Cl.
*G06F 13/40* (2006.01)
*G06F 13/16* (2006.01)

(52) U.S. Cl.
CPC ...... *G06F 13/4081* (2013.01); *G06F 13/1668* (2013.01)

(58) Field of Classification Search
CPC .......................... G06F 13/4081; G06F 13/1668
USPC ......................................................... 710/302
See application file for complete search history.

(56) References Cited

U.S. PATENT DOCUMENTS

| | | | |
|---|---|---|---|
| 2008/0005377 A1* | 1/2008 | Lambert ................. | G06F 1/266 710/15 |
| 2016/0028404 A1* | 1/2016 | Berke ..................... | G06F 21/85 377/94 |
| 2019/0280411 A1 | 9/2019 | Olarig et al. | |
| 2021/0026428 A1 | 1/2021 | Olarig et al. | |
| 2022/0036852 A1* | 2/2022 | Wesneski .............. | G06F 3/1407 |
| 2022/0114056 A1* | 4/2022 | Lee ...................... | G06F 11/1441 |

* cited by examiner

*Primary Examiner* — Chun Kuan Lee
(74) *Attorney, Agent, or Firm* — ScienBiziP, P.C.

(57) ABSTRACT

A server system, a method, and a non-transitory computer readable medium for hot plugging includes a CPLD detecting an existence of a NVME SDD in the server system, the CPLD transmitting a first signal to the NVME SDD, the NVME SDD starting to run; a BMC controlling a hot plug control module to run, the hot plug control module continuously outputting second signals and third signals; a logic selecting module receiving the first signal, the second signal, and the third signal, and selecting corresponding signals for outputting to the NVME SDD according to the third signal; and when the logic selecting module selecting the first signal and outputting the first signal to the NVME SDD, the NVME SDD keeping running; when the logic selecting module selecting the second signal and outputting the second signal to the NVME SDD, the NVME SDD executing hot plugging.

18 Claims, 4 Drawing Sheets

METHOD, SERVER SYSTEM, AND NON-TRANSITORY COMPUTER READABLE MEDIUM FOR HOT PLUGGING

CROSS-REFERENCE TO RELATED APPLICATIONS

This application claims priority to Chinese Patent Application No. 202210314469.7 filed on Mar. 28, 2022, in China National Intellectual Property Administration, the contents of which are incorporated by reference herein.

FIELD

The subject matter herein generally relates to server technology, and particularly to a method, a server system, and a non-transitory computer readable medium for hot plugging.

BACKGROUND

Non volatile memory host controller interface specification (NVME) is a standardized and high-performance software interface used for solid state disk (SSD) using peripheral component interconnect express (PCIE) protocol. The PCIE protocol runs more stably and faster for an SSD in the NVME.

When an SSD using PCIE is added to a running operating system (OS), it can be for adding capacity or replacing faulty driver, which is called hot plug in. When disconnecting the SSD from the running OS, this is called hot plug out. These two situations may be called hot plugging. When hot plugging, there may be some unfinished input/output (I/O) activity in the system, if the SSD is falsely plugged or unplugged, the I/O activity may be interrupted.

At present, there are two kinds of hot plugging, one is manual hot plugging, which may be falsely operated and may fail to cover thousands of cyclic pluggings; the other one is automatically hot plugging, which has high cost.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
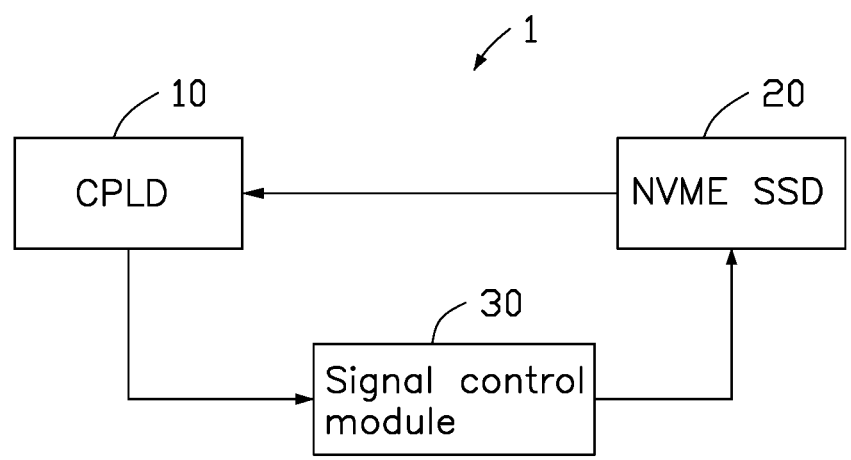
FIG. 1 is a schematic view of an embodiment of a server system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Normally in a server system, a Complex Programmable Logic Device (CPLD) may monitor the existence of a Non Volatile Memory Host Controller Interface Specification Solid State Disk (NVME SDD), and control a connection for signals and for power according to the existence of the NVME. The CPLD and the NVME are set structures in the server system, the CPLD may control the connection of the NVME signals or power source for testing NVME hot plugging, which may improve an accuracy and decrease a cost.

FIG. 1 illustrates a schematic view of an embodiment of a server system 1. The server system 1 includes a CPLD 10, an NVME SDD 20, and a signal control module 30.

The CPLD 10 is configured to detect existence of the NVME SDD 20 in the server system 1. When the CPLD 10 detects that the NVME SDD 20 exists, the signal control module 30 is activated, and the signal control module 30 outputs a first signal 51 to the NVME SDD 20.

In at least one embodiment, when the NVME SDD 20 is present in the server system 1, the NVME SDD 20 transmits a first status signal P to the CPLD 10 through interfaces thereof, upon the CPLD 10 receiving the first status signal P it determines that the NVME SDD 20 exists.

Figure 2:
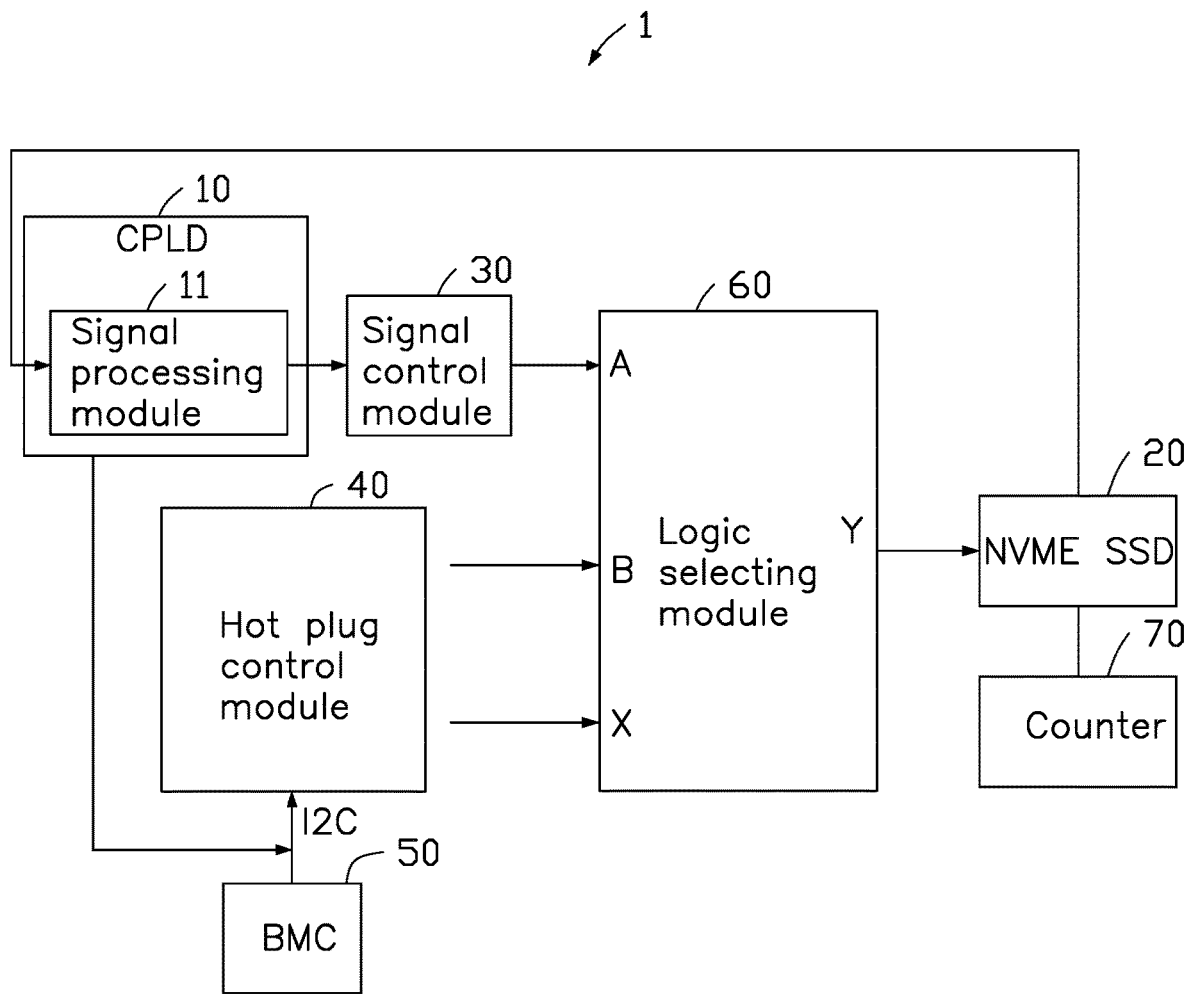
FIG. 2 illustrates the server system of the present disclosure.

FIG. 2 illustrates the server system 1 as including a hot plug control module 40, a Baseboard Management Controller (BMC) 50, a logic selecting module 60, and a counter 70. The CPLD 10 includes a signal processing module 11.

The signal processing module 11 is configured to process the first status signal P received by the CPLD 10 (such as by debouncing the first status signal P), and transmit the processed first status signal P to the signal control module 30.

In at least one embodiment, the first status signal P may be lost during a transmission from the NVME SDD 20 to the CPLD 10, thus the processing by the signal processing module 11 improves a signal strength of the first status signal P, and thus when the first status signal P is transmitted to the signal control module 30, the signal control module 30 may detect the first status signal P more clearly and faster.

The hot plug control module 40 is configured to transmit a hot plug signal and a logic signal, that is a second signal S2 and a third signal S3, to control a running of the NVME SDD 20. In at least one embodiment, the server system 1 stores predetermined program codes, the second signal S2 and the third signal S3 are regularly output by hot plug control module 40 by running the predetermined program codes.

The BMC 50 is configured to control the hot plug control module 40 to be on or off. In at least one embodiment, the BMC 50 is connected to a serial bus I2C, the BMV 50 transmits control signals to the hot plug control module 40 through the serial bus I2C.

The logic selecting module 60 is configured to select corresponding signals for transmission according to the third signal S3 transmitted from the hot plug control module 40. The logic selecting module 60 includes a first input port A, a second input port B, a third input port X, and an output port Y. The first input port A is configured to receive the first signal S1, the second input port B is configured to receive the second signal S2, and the third input port X is configured to receive the third signal S3. The output port Y is configured to output the signals selected by the logic selecting module 60.

In at least one embodiment, the logic selecting module 60 may be an alternative data logic selection module, of which a logic expression may be:

$$Y=\overline{X}A+XB$$

Part of a Truth Table of the logic expression may be:

| X | A | B | Y |
|---|---|---|---|
| 0 | 1 | 1 | A |
| 1 | 1 | 1 | B |

According to this logic, when the first input port A received the first signal S1, the second input port B received the second signal S2, if the third input port X receives the third signal S3 as a low level signal, that is, the hot plug control module 40 outputs a low level signal as the third signal S3, the output port Y outputs the first signal S1, that is the logic selecting module 60 selectively outputs the first signal S1. If the third input port X receives the third signal S3 as a high level signal, that is, the hot plug control module 40 outputs a high level signal as the third signal S3, the output port Y outputs the second signal S2, that is the logic selecting module 60 selectively outputs the second signal S2.

Furthermore, the logic selecting module 60 transmits the selectively outputted signals to the NVME SDD 20, and the NVME SDD 20 determines whether to perform hot plugging according to the received signals.

The counter 70 is electrically connected to the NVME SDD 20 and configured to count number of hot plugs of the NVME SDD 20. In at least one embodiment, the CPLD 10 may predetermine a number of the hot plug control module 40 transmits signals according to a duty cycle of the hot plug control module 40 when running, so as to predetermine a number of hot plugs executed by the NVME SDD 20, that being a first predetermined value. The counter 70 limits the number of hot plugs to the first predetermined value. When the counter 70 counts to the first predetermined value, the BMC 50 may stop running of the hot plug control module 40, the NVME SDD 20 may no longer execute hot plugs.

Figure 3:
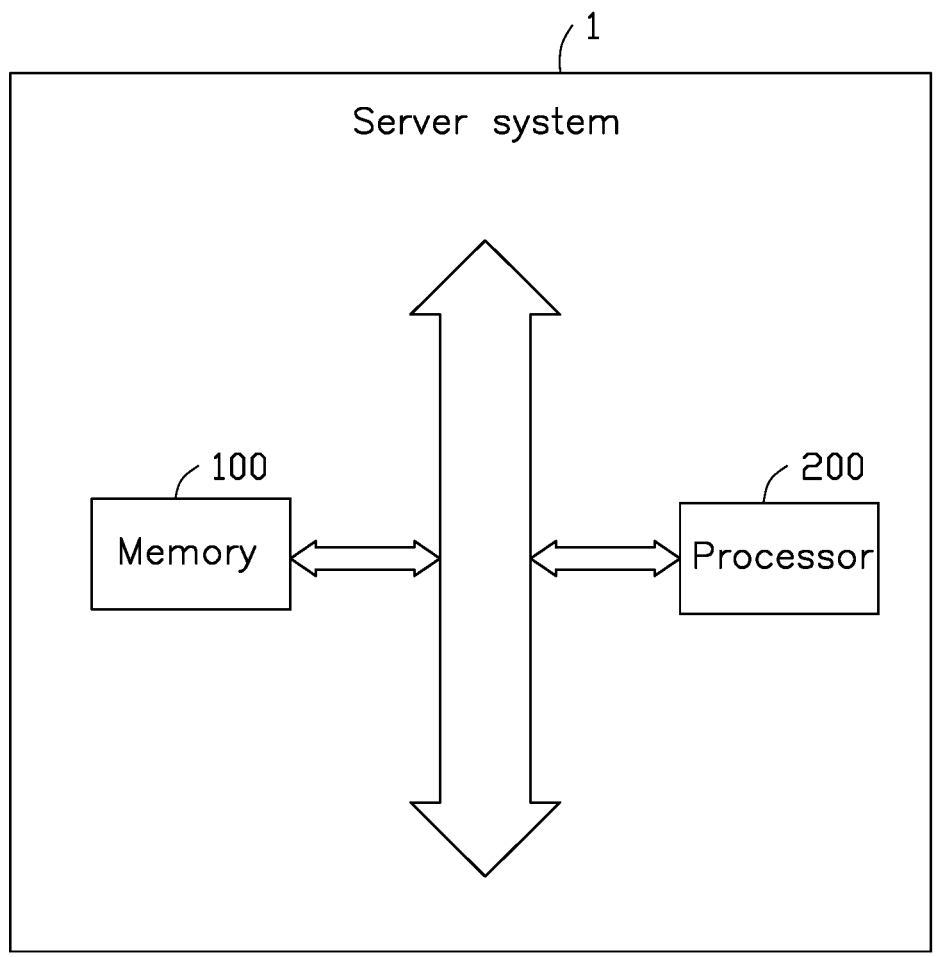
FIG. 3 is another schematic view of an embodiment of the server system.

FIG. 3 illustrates the server system 1 as including a memory 100 and at least one processor 200. It should be known that, the server system 1 as shown in FIG. 3 is not limited, the server system 1 may include more or less hardware or software, or may be arrangements different from those of the figures.

In at least one embodiment, the processor 200 can be formed by integrated circuits, such as an individual integrated circuit or multiple integrated circuits with a same function or different functions. The processor 200 includes, but is not limited to, a central processing unit (CPU), a microprocessor, a digital signal processor (DSP), a graphics processor, an application specific integrated circuit (ASIC), a field-programmable gate array (FPGA), a data processor chip, a programable logic device (PLD), a discrete gate/transistor logic device, or a discrete hardware component. The processor 200 may be a control unit and electrically connected to other elements of the server system 1 through interfaces or a bus. In at least one embodiment, the various types of non-transitory computer-readable storage mediums stored in the memory 100 can be processed by the processor 200 to perform various functions, such as the method for hot plugging.

In at least one embodiment, the processor 200 may further include one or more interfaces or connectors, which can be but are not limited to, Inter-Integrated Circuit (I2C) interface, Inter-Integrated Circuit Sound (I2S) interface, Pulse Code Modulation (PCM) interface, Universal Asynchronous Receiver/Transmitter (UART) interface, Mobile Industry Processor Interface (MIPI), General-Purpose Input/Output (GPIO) interface, Subscriber Identity Module (SIM) interface, Universal Serial Bus (USB), etc.

In at least one embodiment, the memory 100 can include various types of non-transitory computer-readable storage mediums. The memory 100 can rapidly and automatically access instructions and data when the server system 1 is running. The memory 100 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), and a Compact Disc Read-Only Memory (CD-ROM) for the permanent storage of information. The memory 100 can also be an external storage system, such as a hard disk, a storage card, or a data storage medium.

Figure 4:
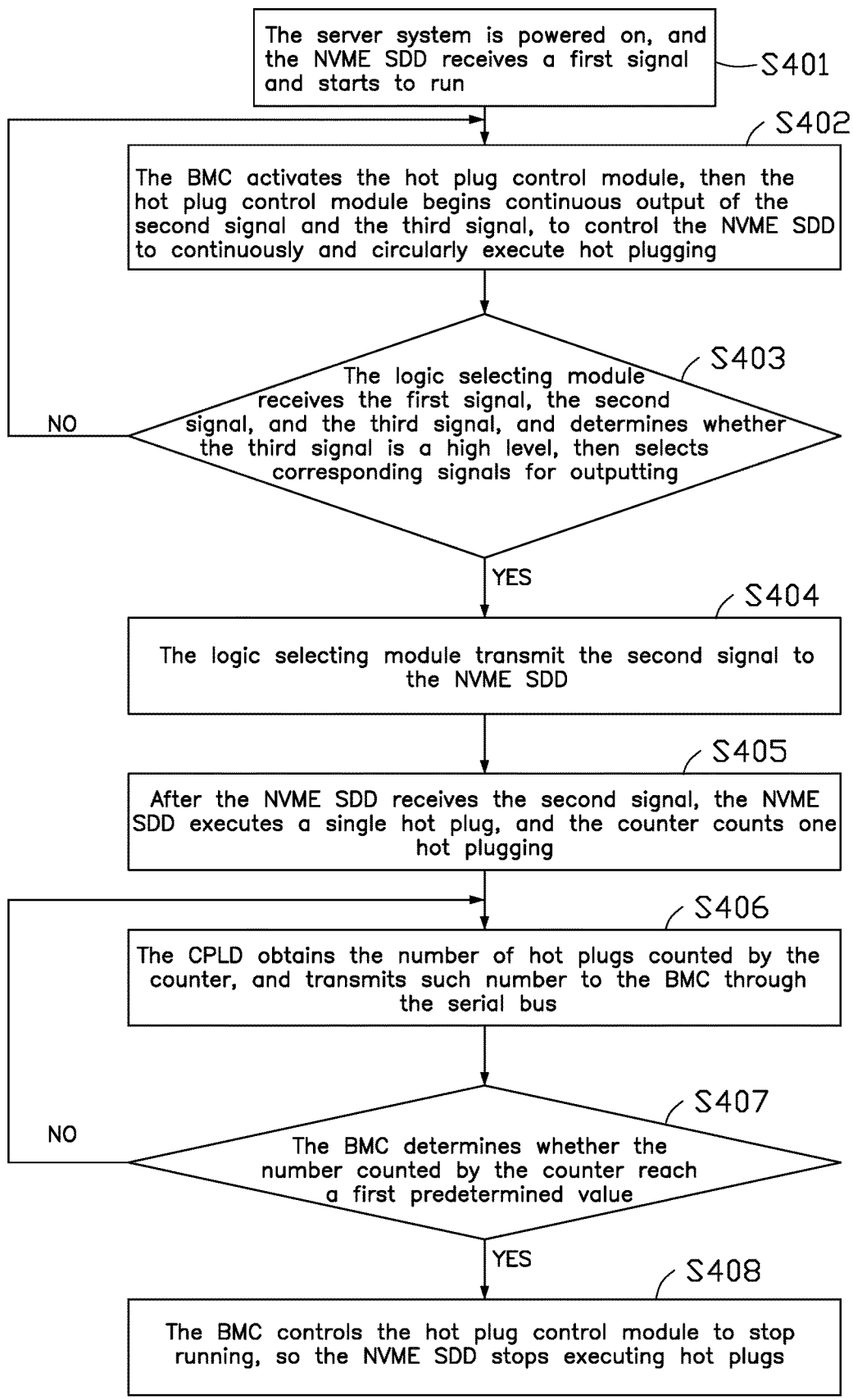
FIG. 4 illustrates a flowchart of an embodiment of a method for hot plugging.

FIG. 4 illustrates a flowchart of at least one embodiment of a method for hot plugging.

In at least one embodiment, the method for hot plugging may be applied in the server system 1 showing in FIGS. 1 and 2. The functions may be integrated in the server system 1 for the method for hot plugging. In another embodiment, the method for hot plugging can be run in a form of software development kit in the computer apparatus.

The method is provided by way of example, as there are a variety of ways to carry out the method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S401.

At block S401, the server system 1 is powered on, and the NVME SDD 20 receives a first signal and starts to run.

In at least one embodiment, the server system 1 installs the NVME SDD 20 and detects existence of the NVME SDD 20 in the server system 1 through the CPLD 10, then activates the signal control module 30, the signal control module 30 transmits the first signal S1 to the NVME SDD 20 so that the NVME SDD 20 starts to run.

In at least one embodiment, the signal control module 30 transmits the first signal S1 to the NVME SDD 20 through the logic selecting module 60.

At block S402, the BMC 50 activates the hot plug control module 40, then the hot plug control module 40 begins continuous output of the second signal S2 and the third signal S3, to control the NVME SDD 20 to continuously and circularly execute hot plugging.

When the CPLD 10 detects the NVME SDD 20 existing in the server system 1, the BMC 50 activates the hot plug control module 40.

In at least one embodiment, the BMC 50 transmits a first control signal to the hot plug control module 40 through the serial bus I2C, the hot plug control module 40 starts to run after receiving the first control signal, and regularly and circularly outputs the second signal S2 and the third signal S3 according to the program codes stored in the memory 100, to control the NVME SDD 20 to circularly execute hot plug.

In at least one embodiment, the hot plug control module 40 may output the third signal S3 as a high level signal or a low level signal according to the program codes stored in the memory 100.

At block S403, the logic selecting module 60 receives the first signal S1, the second signal S2, and the third signal S3, and determines whether the third signal S3 is a high level or a low level signal, then selects corresponding signals (such as the first signal S1, the second signal S2) for outputting.

When the third signal S3 outputted by the hot plug control module 40 is a low level signal, the logic selecting module 60 selects the first signal S1 for outputting, and block S402 is processed.

In at least one embodiment, when the logic selecting module 60 selects the first signal S1 for outputting, the logic selecting module 60 transmits the first signal S1 to the NVME SDD 20 through the output port Y, and the NVME SDD 20 continues to run.

When the third signal S3 outputted by the hot plug control module 40 is a high level signal, the logic selecting module 60 selects the second signal S2 for outputting, and block S404 is processed.

In at least one embodiment, when the logic selecting module 60 selects the second signal S2 for outputting, the logic selecting module 60 transmits the second signal S2 to the NVME SDD 20 through the output port Y, and the NVME SDD 20 executes hot plugging.

At block S404, the logic selecting module 60 transmit the second signal S2 to the NVME SDD 20.

At block S405, after the NVME SDD 20 receives the second signal S2, the NVME SDD 20 executes a single hot plug, and the counter 70 counts one hot plugging.

In at least one embodiment, when the NVME SDD 20 receives the first signal S1 or the second signal S2, a system log is generated and stored in the NVME SDD 20. The server system 1 may set shell script for dumping the system log stored in the NVME SDD 20, to save a storage room of the NVME SDD 20 and allow new signals to be received.

At block S406, the CPLD 10 obtains the number of hot plugs counted by the counter 70, and transmits such number to the BMC 50 through the serial bus I2C.

At block S407, the BMC 50 determines whether the number counted by the counter 70 reach a first predetermined value.

When the BMC 50 determines that the number counted by the counter 70 reaches the first predetermined value, the BMC 50 controls the hot plug control module 40 to stop running, then block S408 is processed.

When the BMC 50 determines that the number counted by the counter 70 does not reach the first predetermined value, the BMC 50 keeps the hot plug control module 40 running, then block S406 is processed.

At block S408, the BMC 50 controls the hot plug control module 40 to stop running, so the NVME SDD 20 stops executing hot plugs.

The method for hot plugging provided by the present disclosure uses the CPLD 10 for controlling the hot plugging of the NVME SDD 20, to prevent errors in hot plugging and improve reliability of hot plugging, and also saving a cost of the server system 1 executing hot plugging.

A non-transitory computer-readable storage medium including program instructions for causing the computer apparatus to perform the method for hot plugging is also disclosed.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for hot plugging applied in a server system, the server system comprising a complex programmable logic device (CPLD), a Non Volatile Memory Host Controller Interface Specification Solid State Disk (NVME SDD), a hot plug control module, a Baseboard Management Controller (BMC), and a logic selecting module; the method comprising:
    the CPLD detecting an existence of the NVME SDD in the server system after the server system is activated, the CPLD transmitting a first signal to the NVME SDD, the NVME SDD starting to run;
    the BMC controlling the hot plug control module to run after the NVME SDD is activated, the hot plug control module continuously outputting second signals and third signals;
    the logic selecting module receiving the first signal, the second signal, and the third signal, and selecting corresponding signals for outputting to the NVME SDD according to the third signal; and
    when the logic selecting module selecting the first signal and outputting the first signal to the NVME SDD, the NVME SDD keeping running; when the logic selecting module selecting the second signal and outputting the second signal to the NVME SDD, the NVME SDD executing hot plugging.

2. The method according to claim 1, further comprising:
    when the third signal outputted by the hot plug control module being a low level signal, the logic selecting module selecting the first signal for outputting; and
    hen the third signal outputted by the hot plug control module being a high level signal, the logic selecting module selecting the second signal for outputting.

3. The method according to claim 2, further comprising:
after the NVME SDD receiving the second signal, the NVME SDD executing a single hot plugging, counting one hot plugging by a counter.

4. The method according to claim 3, further comprising:
the CPLD obtaining the number of hot plugging counted by the counter, and transmitting the number of hot plugging to the BMC.

5. The method according to claim 4, further comprising:
after the BMC receiving the number of hot plugging counted by the counter, determining whether the number of hot plugging counted by the counter reach a first predetermined value;
when the BMC determining the number of hot plugging counted by the counter reaches the first predetermined value, the BMC controlling the hot plug control module to stop running, the NVME SDD stopping executing hot plugging; and
when the BMC determining the number of hot plugging counted by the counter does not reach the first predetermined value, the BMC controlling the hot plug control module to keep running.

6. A server system comprising:
a CPLD detecting an existence of a NVME SDD in the server system after the server system is activated, the CPLD transmitting a first signal to the NVME SDD, the NVME SDD starting to run;
a BMC controlling a hot plug control module to run after the NVME SDD is activated, the hot plug control module continuously outputting second signals and third signals;
a logic selecting module receiving the first signal, the second signal, and the third signal, and selecting corresponding signals for outputting to the NVME SDD according to the third signal; and
when the logic selecting module selecting the first signal and outputting the first signal to the NVME SDD, the NVME SDD keeping running; when the logic selecting module selecting the second signal and outputting the second signal to the NVME SDD, the NVME SDD executing hot plugging.

7. The server system according to claim 6, further comprising a signal control module, wherein when the CPLD detects the existence of the NVME SDD in the server system, the signal control module is activated to output the first signal to the NVME SDD.

8. The server system according to claim 6, wherein when the third signal outputted by the hot plug control module being a low level signal, the logic selecting module selects the first signal for outputting; and
when the third signal outputted by the hot plug control module being a high level signal, the logic selecting module selects the second signal for outputting.

9. The server system according to claim 8, wherein after the NVME SDD receives the second signal, the NVME SDD executes a single hot plugging, counting a number of hot plugging by a counter.

10. The server system according to claim 9, wherein the CPLD obtains the number of hot plugging counted by the counter, and transmits the number of hot plugging counted by the counter to the BMC.

11. The server system according to claim 10, wherein after the BMC receives the number of hot plugging counted by the counter, the BMC determines whether the number of hot plugging counted by the counter reach a first predetermined value;
when the BMC determines the number of hot plugging counted by the counter reaches the first predetermined value, the BMC controls the hot plug control module to stop running, the NVME SDD stops executing hot plugging; and
when the BMC determines the number of hot plugging counted by the counter does not reach the first predetermined value, the BMC controls the hot plug control module to keep running.

12. The server system according to claim 6, wherein the logic selecting module comprises a first input port, a second input port, a third input port, and an output port; the first input port is configured to receive the first signal, the second input port is configured to receive the second signal, the third input port is configured to receive the third signal, the output port is configured to output the signals selected by the logic selecting module.

13. The server system according to claim 6, wherein when the NVME SDD is running in the server system, the NVME SDD transmits a first status signal to the CPLD, when the CPLD receives the first status signal, the CPLD determines the NVME SDD exists in the server system;
the CPLD comprises a signal processing module configured to process the first status signal, and transmit the processed first status signal to the signal control module.

14. A non-transitory computer readable medium comprising program instructions for causing a server system to perform at least the follow:
detecting an existence of a NVME SDD in the server system after the server system is activated by a CPLD, transmitting a first signal to the NVME SDD by the CPLD, the NVME SDD starting to run;
controlling a hot plug control module to run after the NVME SDD is activated by a BMC, continuously outputting second signals and third signals by the hot plug control module;
receiving the first signal, the second signal, and the third signal, and selecting corresponding signals for outputting to the NVME SDD according to the third signal by a logic selecting module; and
when the logic selecting module selecting the first signal and outputting the first signal to the NVME SDD, the NVME SDD keeping running; when the logic selecting module selecting the second signal and outputting the second signal to the NVME SDD, the NVME SDD executing hot plugging.

15. The non-transitory computer readable medium according to claim 14, further to perform:
when the third signal outputted by the hot plug control module being a low level signal, the logic selecting module selecting the first signal for outputting; and
when the third signal outputted by the hot plug control module being a high level signal, the logic selecting module selecting the second signal for outputting.

16. The non-transitory computer readable medium according to claim 15, further to perform:
after the NVME SDD receiving the second signal, the NVME SDD executing a single hot plugging, counting a number of hot plugging by a counter.

17. The non-transitory computer readable medium according to claim 16, further to perform:
the CPLD obtaining the number of hot plugging counted by the counter, and transmitting the number of hot plugging counted by the counter to the BMC.

18. The non-transitory computer readable medium according to claim 17, further to perform:

after the BMC receiving the number of hot plugging counted by the counter, determining whether the number of hot plugging counted by the counter reach a first predetermined value;

when the BMC determining the number of hot plugging counted by the counter reaches the first predetermined value, the BMC controlling the hot plug control module to stop running, the NVME SDD stopping executing hot plugging; and when the BMC determining the number of hot plugging counted by the counter does not reach the first predetermined value, the BMC controlling the hot plug control module to keep running.

\* \* \* \* \*